March 31, 1959
L. E. GREEN
2,879,896
TOOL HOLDER
Filed June 2, 1955
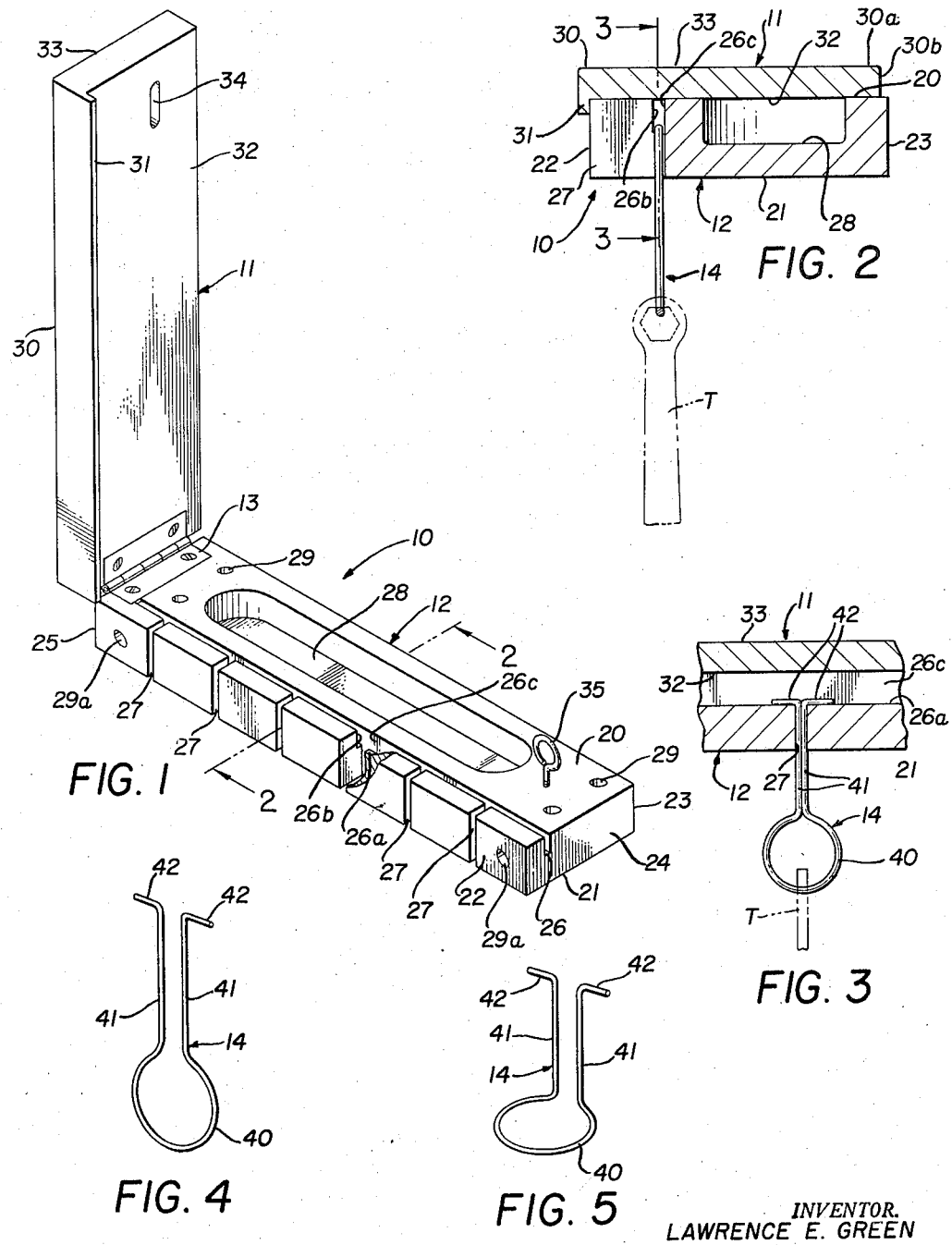
INVENTOR.
LAWRENCE E. GREEN
BY J. William Freeman
ATTORNEY

United States Patent Office 2,879,896
Patented Mar. 31, 1959

2,879,896

TOOL HOLDER

Lawrence E. Green, Akron, Ohio

Application June 2, 1955, Serial No. 512,620

3 Claims. (Cl. 211—4)

This invention relates to tool holding apparatus, and in particular relates to an improved type of tool holder having means for locking the tools to the holder.

In the care and storage of tools, it has long been contemplated that tools should be stored upon individual holders to properly support the same. However, tool holders of the prior art that have been provided for this purpose have had the disadvantage that tools stored thereon could be easily removed from such hangers by improper persons for unauthorized use. Tools so removed, were seldom replaced, with the result that loss occurred to the owner thereof.

As an alternative, special cupboards or closets having locks thereon, were provided. However, such storage areas, while obviating unauthorized use of tools, were disadvantageous in that the cost feature of the same was oftentimes prohibitive.

Accordingly, it is one object of this invention to provide a tool holder of simplified construction, that individually supports a plurality of exposed tools against unauthorized removal.

It is a further object of this invention to provide a tool holder that locks exposed tools in place thereon and is characterized by the fact that tools may be easily positioned and removed with respect to said tool holder.

It is a still further object of this invention to provide a tool holder that can be selectively mounted on a plurality of surfaces against an ordinary wall surface, and which is characterized by a compactness in size with respect to the bulk of tools supported thereby.

These and other objects of the invention will become more apparent upon a reading of the following brief specification, considered and interpreted in the light of the accompanying drawings.

Of the drawings:

Figure 1 is a perspective view of the improved tool holder in the open position.

Figure 2 is a view taken on the lines 2—2 of Figure 1, but showing the improved tool holder in closed position with a tool supported thereby.

Figure 3 is a view taken on the lines 3—3 of Figure 2.

Figures 4 and 5 are perspective views illustrating typical hangers used in connection with the improved tool holder.

Referring now to the drawings, and in particular to Figures 1 and 2 thereof, the improved tool holder, generally designated as 10, is shown as being of hinged construction, wherein a cover member 11 swings into and out of contact with a tool carrying plate 12 through hinge 13, so as to permit reception of tools T on removable hangers 14, 14.

Considering first the structure of the tool carrying plate 12, it will be seen from the drawings that the same is of elongated rectangular configuration so as to define a top surface 20, a bottom surface 21, front and rear surfaces 22, 23, respectively, and end surfaces 24, 25. For the purpose of receiving tools in a manner to be described, the top surface 20 is shown provided with a slot or groove 26, that extends longitudinally of surface 20 to open into opposed end surfaces 24 and 25, it being understood that the slot 26 defines a bottom wall 26a, and side walls 26b, 26c with bottom wall 26a being a support surface for the removable hangers 14, 14 as shown in Figures 2 and 3.

As best shown in Figure 1 of the drawings, the front surface 22 of plate 12 includes a series of slots 27, 27 that are spaced longitudinally of the surface 22 and extend transversely of the member 12 so as to intersect the slot 26; the arrangement being such that the actual transverse depth of each slot 27 is defined by wall 26c of slot 26 so that these slots 27, 27 provide a series of access openings from front surface 22 to slot 26.

In addition to the aforementioned component parts, the top surface 20 further includes an elongate undercut 28 that facilitates reception of small parts and tools therein when the member 12 is mounted on a wall or other surface. To the end of effectuating such mounting, the member 12 has apertures 29, 29 interconnecting surfaces 20 and 21, while apertures 29a, 29a interconnect front and rear surfaces 22 and 23. In this manner, either the surface 21 or 23 can be abutted against the wall surface by use of apertures 29, 29, or 29a, 29a, respectively.

Turning now to the cover plate 11, the same is shown in the drawings as being complemental in its elongated rectangular configuration to the member 12, whereby movement about hinge 13 will permit closure of the cover plate 11 over the tool carrying plate 12, as shown in Figure 2. In order that both slots 26 and 27, 27 might be covered to prevent removal of hangers 14, 14, the front edge 30 of cover plate 11 is shown defining a longitudinal lip 31 that overlies the surface 22 and consequently covers the longitudinally spaced slots 27, 27. By like token, the rear edge portion 30a of plate 11 is provided with clearance 30b for permitting swinging about hinge 13. Similarly, the surfaces 32 and 33 are shown interconnected by an elongated slot 34 that is received about screw eyelet 35 that is carried on surface 20 of plate 12.

With reference now to the construction of the hangers 14, 14, it will be seen from an examination of Figures 4 and 5 that each hanger has a central loop section 40 that opens into shanks 41, 41, the free ends of which are formed at substantially right angles to define support legs 42, 42. In Figure 4 the loop 40, shanks 41, 41 and legs 42, 42 are all presented in the same plane, while in Figure 5 the loop 40 has the plane thereof disposed at right angles to the plane of the shanks 41, 41 and legs 42, 42, so as to receive a different shape of tool. In both cases, however, the thickness of the shanks 41, 41 and the legs 42, 42 are such that the former (shanks 41, 41) are capable of abutment together (see Figure 3) for passage through slots 27, 27, while legs 42, 42 are received between the wall surfaces 26a, 26b, and 26c as shown in Figure 2 of the drawings.

In use or operation of the improved tool holder 10, the user thereof first fastens the same to the wall by use of screws positioned through either the apertures 29, 29 or the apertures 29a, 29a, dependent upon whether it is desired to have the surface 21 or the surface 23 in abutment with the wall or other supporting area being used.

With the holder 10 positioned as just described, a tool T of the type shown in Figure 2, may be positioned on hanger 14 by passing the aperture thereof over the leg 42 and shank 41 until the same encircles the loop portion 40. At this time the shanks 41, 41 may be abutted as shown in Figure 3 by the exercise of manual pressure, and with the shanks thus abutted, the two shanks may be passed through slot 27 and moved transversely of plate 12 until the legs 42, 42 are over the slot 26, at which time the tool T may be pulled downwardly to depress the legs 42, 42 within the slot 26. At this time, another tool T may be similarly positioned, and when all tools have been so positioned the cover 11 may be pivoted about hinge 13 so as to place surfaces 32 and 20 in coplanar abutment, with the slot 34 passing over eyelet 35 during such movement. A lock (not shown) may be passed through the exposed eyelet 35 to retain the holder 10 in the closed position of Figure 2.

During the period that the holder 10 is in the closed position of Figures 2 and 3, it is apparent that the open end of the individual hangers 14, 14 will be closed as a result of the legs 42, 42 being positioned in the closed space defined by wall surfaces 26a, 26b, 26c and 32; and accordingly, the legs 42, 42 will not be permitted to be removed from this closed space until the cover plate 11 is moved to the position of Figure 1, at which time the slot 26, as well as slots 27, 27 will be opened to permit removal of the hanger 14 and the tool thereon.

It will be seen from the foregoing that there has been provided a new and novel type of tool holder characterized by an ability to easily retain tools therein against theft. It has been shown how the improved tool holder is easy to install, and how tools may be easily positioned and removed with respect to the same with a minimum amount of effort.

In the preferred embodiment of the invention, the drawings have indicated the body portions of the tool holder as being of wood, but it is to be understood that other materials may be satisfactorily employed without effecting the operation of the improved tool holder. Similarly, while certain forms and styles of tool holders have been indicated in disclosing the invention, it is to be understood that other forms and designs of hangers could be utilized by use of the teachings above set forth. By like token, while the cover 11 has been described as being hinged, it is apparent that the same could slide or otherwise be shiftable on the tool carrying plate 12 to selectively expose and cover the slots 26 and 27, 27.

It follows that other modifications of the invention may be resorted to without departing from the spirit of this invention or the scope of the appended claims.

What is claimed is:

1. A tool holder of the character described, comprising; a tool supporting block having a front and top surface; a groove in the top of said block parallel to said front surface; an access opening connecting said groove with said front surface of said block; an open-end loop-type hanger having the free ends thereof releasably associated with said groove, whereby said loop is closed; and means for selectively retaining said free ends of said loop in said groove against removal through said access opening, whereby articles carried on said closed loop are incapable of being removed therefrom; said means including a cover plate, shiftable with respect to said block, to selectively open and close said access opening.

2. A tool holder of the character described, comprising; a block having a front and top surface; a groove in the top of said block parallel to said front surface; an access opening communicating said front support surface with the exterior surface of said block; a cover plate, shiftable with respect to said block, whereby said access opening is selectively opened and closed; and a hanger having a tool receiving loop that is defined by a pair of free ends, whereby access to said loop is through said free ends; said free ends being releasably associated with said groove with said loop being closed when said ends are so positioned.

3. A tool holder of the character described, comprising; a rectangular block having top and front surfaces and including a longitudinal slot extending inwardly from said top surface adjacent and substantially parallel one longitudinal edge thereof; a plurality of access slots spaced along the longitudinal length of the front surface and extending transversely thereof for interconnection with said longitudinal slot; a plurality of open end hook members, receivable through said access slots and positioned within said longitudinal slot; and a cover plate hinged to said block for coplanar abutment with said top surface, whereby ingress and egress to said longitudinal slot may be controlled.

References Cited in the file of this patent
UNITED STATES PATENTS

| | | |
|---|---|---|
| 1,039,359 | Brown | Sept. 24, 1912 |
| 1,342,362 | Waelty | June 1, 1920 |
| 1,695,517 | Waldbauer | Dec. 18, 1928 |
| 2,068,451 | Elmore | Jan. 19, 1937 |
| 2,348,271 | Vonschott | May 9, 1944 |
| 2,507,886 | Carlson | May 16, 1950 |
| 2,615,577 | Bartleman | Oct. 28, 1952 |